I. E. McCRACKEN.
GEAR CUTTING MACHINE.
APPLICATION FILED OCT. 2, 1912.

1,085,748.

Patented Feb. 3, 1914.
2 SHEETS—SHEET 1.

WITNESSES
Chas. Footerman
Elbert L. Hyde

INVENTOR
Isaac E. McCracken
By Fredk. W. Winter
Attorney.

I. E. McCRACKEN.
GEAR CUTTING MACHINE.
APPLICATION FILED OCT. 2, 1912.
1,085,748.
Patented Feb. 3, 1914.
2 SHEETS—SHEET 2.
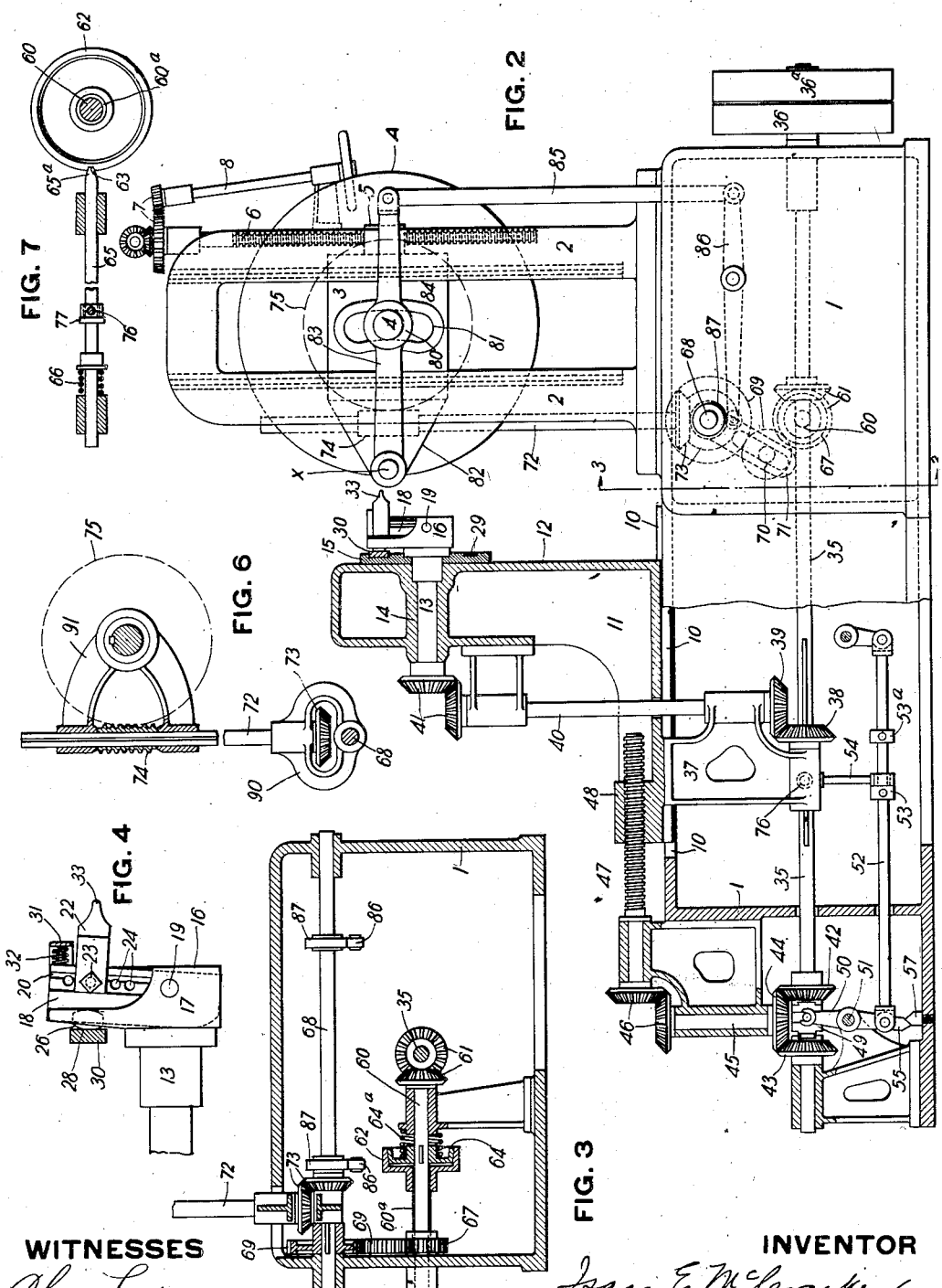
WITNESSES
Chas. Posterman
Elbert L. Hyde
INVENTOR
Isaac E. McCracken,
By Fredk. W. Winter
Attorney

UNITED STATES PATENT OFFICE.

ISAAC E. McCRACKEN, OF PITTSBURGH, PENNSYLVANIA.

GEAR-CUTTING MACHINE.

1,085,748. Specification of Letters Patent. Patented Feb. 3, 1914.

Application filed October 2, 1912. Serial No. 723,578.

*To all whom it may concern:*

Be it known that I, ISAAC E. MCCRACKEN, a resident of Pittsburgh, in the county of Allegheny and State of Pennsylvania, have invented a new and useful Improvement in Gear-Cutting Machines, of which the following is a specification.

This invention relates to a machine for cutting gears or pinions, and particularly what are known as herring bone gears or pinions.

The object of the invention is to provide a new and improved machine for forming a special type of herring bone gear having continuous teeth across the full width of the gear, and which machine cuts or forms said teeth for their full length by a continuous cutting operation, thereby producing a gear having full strength along its median plane.

The invention comprises the construction and arrangements of parts hereinafter described and claimed.

Figure 1:
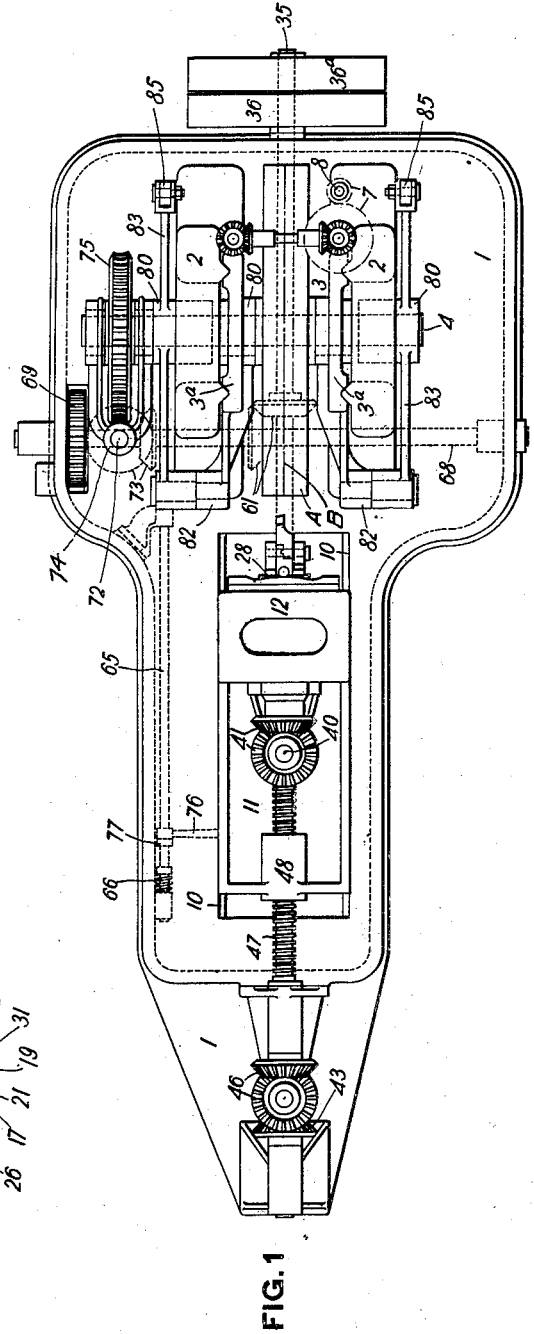
Figure 9:
Figure 10:
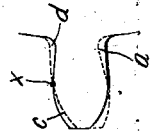
Figure 11:
Figure 8:
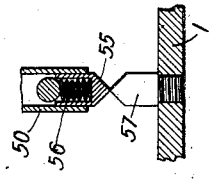
Figure 5:
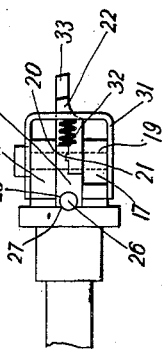

In the drawings Figure 1 represents a plan view of a machine constructed according to my invention; Fig. 2 is a broken out side elevation thereof, parts being shown in section; Fig. 3 is a detail section on the line 3—3, Fig. 2, and showing the indexing mechanism; Figs. 4 and 5 are respectively plan and side elevations of the tool spindle and tool carried thereby; Fig. 6 is a detail view showing the indexing worm; Fig. 7 is a detail view of a clutch member and its controlling mechanism; Fig. 8 is a detail view of a latch; Fig. 9 is a plan of a gear formed on the present machine; and Figs. 10 and 11 are diagrammatic views illustrating the teeth being cut.

The machine shown in the drawings comprises a suitable bed or table 1, at one end of which are erected standards 2 supporting a double carriage 3 in which is rotatable a horizontally disposed work holding arbor
4. The members 3ª of carriage 3 are provided with threaded nuts 5 in which work interconnected screws 6 operated by intermeshing gears 7 from controlling shaft 8 for adjusting the carriage and work holding arbor 4 vertically along the usual ways on the standards 2. The bed or table 1 is provided with the usual longitudinal ways 10, along which travels a tool carriage 11 having a standard 12 at the forward end thereof in which is journaled a tool holding arbor 13 having its axis disposed longitudi-
nally of the bed or table and transverse to the axis of the work holding arbor 4.

The tool carrying spindle 13 rotates in a suitable bearing 14 in standard 12 and its forward end projects through a face plate or block 15 rigidly secured to the front wall of the standard 12. Spindle 13 at its forward end is provided with a head 16 formed of two parallel transverse wings or arms 17 between which is mounted a tool holder or carrier 18 which swings or oscillates on a pin 19 passing through said wings or arms. The axis of the pivot 19 passes through the longitudinal axis of the spindle 13 but at right angles thereto, so that the tool holder 18 swings in a plane passing through the axis of the tool spindle. Tool holder 18 is grooved, as at 20, to receive a transverse rib 21 on a tool or cutter 22 rigidly secured to the tool holder by a suitable bolt 23 passed through an aperture in the tool. Tool holder 18 is provided with one or more slots or apertures 24 so arranged that the tool 22 can be secured at different distances from the axis of the tool spindle. The back of tool holder 18 is provided with a cylindrical socket 25 having its axis normal to the axis of spindle 13, and in which is mounted a ball or roller 26, a portion of which projects through an opening 27 in the tool holder, and during the course of movement of the same around the axis of spindle 13 travels over the cam surface 28 of an annular guide or former 30, rigidly secured in an annular groove 29 in the front face of the plate or block 15. A yoke 31 is secured to and embraces the arms 17 of the tool head 16 and forms an abutment for a compression spring 32, which tightly presses the tool holder 18 and the roller 26 carried thereby into contact with the curved guide or former.

As indicated in Fig. 2, the cutting portion 33 of the tool is eccentric to the axis of spindle 13 and projects forwardly toward the cylindrical blank A to be cut. To form a tooth on the blank, arbor 4 is adjusted vertically in standards 2 until its axis is substantially horizontally in line with the axis of the tool spindle 13, although it may be either above or below, and is shown as slightly above the same. A guide or former 30 of the proper shape being secured in the groove 29 in the plate or block 15, the spindle 13 is then rotated and the tool carriage 11 moved longitudinally of the bed 1 toward the work carrying arbor 4. As the spindle 13 rotates the eccentrically mounted tool 22 sweeps across the face of the cylindrical blank in a curved path and in a vertical plane, and at each complete rotation of spindle 13 makes one cut clear across the face of the blank. The tool also gradually cuts its way deeper and deeper into the work as the carriage 11 is fed forwardly.

Since the surface of blank A is cylindrical and the tool in sweeping across the blank, rises and falls with relation to arbor 4, it is clear that the cut would vary in depth if the tool were immovably fixed on spindle 13. For this reason the tool holder 18 swings as described on the pivot 19, and is moved more or less toward the axis of arbor 4 by the cam 30, thereby producing a uniform pitch line and uniform depth of cut for the full length of the tooth. A separate cutting operation is required for each side of each tooth. When one side of a given tooth has been properly shaped the blank is then rotated or indexed one space and the same operation performed to form the same side of the next tooth, and so on completely around the blank. After half of each tooth has been formed in this manner the arbor 4 is then adjusted vertically for a distance equal to the thickness of the tooth across the pitch line to bring the other sides of the teeth into the proper position with relation to the path of movement of the cutting tool. The operation then proceeds as before until the other sides of all of the teeth have been successively formed, the finished gear having the appearance of that illustrated in Fig. 9.

Any suitable mechanism may be provided for rotating the tool and moving the tool carriage longitudinally on the bed. In the form shown a longitudinal driving shaft 35 is located centrally in suitable bearings underneath the bed of the machine and carries loose and fast driving pulleys 36, 36ª at one end thereof. Tool carriage 11 is provided with a downwardly projecting bracket 37 carrying a bevel gear 38 therein, which gear is splined on shaft 35 and meshes with a bevel gear 39 on a vertical shaft 40 connected to drive the tool spindle 13 by intermeshing bevel gears 41. Gear 38 travels along shaft 35 as the carriage moves endwise. At its rear end shaft 35 is provided with a pair of forward and reverse bevel gears 42 and 43 which both mesh with a bevel gear 44 on a vertical shaft 45, which is connected by bevel gears 46 to rotate a feed screw 47 connected to a nut 48 on the carriage 11. Gears 42 and 43 are loose on the shaft 35 and are driven thereby through a clutch member 49 connected to rotate with said shaft and having teeth to engage coöperating clutch teeth on gear members 42 and 43. Clutch 49 is operated by a lever 50 pivoted at 51 to a fixed portion of the bed and suitably connected to a clutch operating rod 52 on which are adjustably mounted suitable tappets or stops 53, 53ª arranged to be engaged by a projecting arm or bracket 54 rigidly connected to the tool carriage 11. As the tool carriage 11 travels rearwardly, or away from the work carrying arbor, arm 54 strikes stop 53 and moves the rod 52 rearwardly to throw the clutch member 49 into engagement with gear member 42 and rotate feed screw 47 in a direction to feed the tool carriage forwardly. When the carriage reaches its forward limit of movement, arm 54 strikes stop 53ª and throws the clutch 49 to its other position and reverses the movement of the tool carriage.

If desired, suitable means may also be provided for securing a quick throw of the clutch 49 in both directions to thereby prevent the clutch from assuming an inactive neutral position. In the form shown a V-shaped latch 55 is movably mounted upon the clutch lever 50 under the influence of a compression spring 56 and is arranged to engage a similar fixed latch or dog 57 on the bed. The inclined surfaces of the members 55 and 57 are so arranged that the clutch is stable only when in one or the other of its extreme positions of movement and when moved a little more than half way in either direction, spring 56 quickly throws the clutch the rest of the way to reverse the carriage. Preferably, the gears are so proportioned that the forward feed of the carriage is very slow, so the depth of cut at one end of the tooth or gear will be substantially the same as at the other end.

Any suitable means may be provided for indexing the work arbor 4 to bring successive portions of the blank A into position to be operated upon by the cutting tool. In the form shown in the drawings shaft 35 drives a transverse shaft 60 through intermeshing bevel gears 61. Shaft 60 is connected to drive a sleeve 60ª thereon by a slipping friction clutch, one member 62 of which is on the sleeve and is provided with a notch or socket 63 into which normally projects a dog 65ª on the end of a controlling rod or bar 65, forced forwardly under the influence of a compression spring 66. The other member 64 is splined on shaft 60 and pressed into contact with member 62 by a suitable spring 64ª. Sleeve 60ª at its outer end is provided with a pinion 67 which is arranged to drive a shaft 68 located above shaft 60 and parallel thereto, through the interposition of change gears 69 on a shaft 70 carried by an arm 71 swinging around the axis of shaft 68. Shaft 68 drives a vertical shaft 72 through bevel gears 73, said shaft 72 being provided with a worm 74 which drives a worm gear 75 fixed to the work carrying arbor 4.

While the tool is cutting a tooth the dog

65ª on the controlling rod 65 is held in engagement with the notch 63 in the friction member 62 and prevents this member from rotating. The clutch members therefore normally slip on each other. Whenever the carriage is reversed and moves rearwardly or away from the work carrying arbor, an arm 76 fixed to the carriage strikes a stop 77 adjustably mounted on the controlling rod 65 and moves dog 65ª out of engagement with the socket 63 in the friction member 62. The two members of the friction clutch then rotate as one and the vertical shaft 72 is driven from the horizontal shaft 60 through the gear 67, change gears 69 and shaft 68. After the stop 77 has been forced rearwardly the arm 54 contacts stop 53 and throws clutch 49. The carriage 11 then starts forward upon another stroke, at the same time releasing the stop 77 from contact with the arm 76. The dog 65ª is then forced yieldingly by spring 66 into contact with the periphery of the slip member 62, which thereupon rotates for one complete revolution. When the notch 63 again comes around, dog 65ª enters thereinto and the clutch again slips. The gearing is, of course, so proportioned that the complete rotation of member 62 is finished before the carriage advances far enough to move the tool into engagement with the work. The rotation of member 62 in the manner described rotates the worm 74 and worm gear 75 and indexes the blank A one step. The amount of this movement may be varied by changing the relation of the change gears 69 so that one complete revolution of shaft 60 will rotate the worm 74 more or less as desired to suit different sizes of gears. It will also be observed that the indexing of the work carrying arbor begins just before the tool carriage 11 has reached the rear limit of its movement and is completed while the tool is wholly out of engagement with the work.

The machine described is operated in the following manner: A suitable blank A is secured to the work carrying arbor 4 in such position that its central or median plane, indicated by the dotted line B in Fig. 1, is in line with the axis of rotation of the tool carrying spindle 13. The arbor 4 is then adjusted vertically to the proper position and a tool 22 of the proper shape is secured in the tool holder. The machine is then started and the tool carriage 11 travels forwardly toward the work carrying arbor 4 and at each revolution of shaft 13 the roller 26 rides over the former or guide 30 and forces the tool forwardly into engagement with the blank. Preferably, the axis of the tool spindle 13 is placed substantially in line with the axis of the work carrying arbor 4, and to prevent the tool from cutting into the blank as it travels across the same below the axis of arbor 4, the guide or former 30 is secured in the groove 29 so that it projects forwardly from the face of the plate 15. Moreover, it extends only half way around the circumference of the groove. Consequently, when the tool head is traveling around the lower half of the groove it recedes from the blank and passes the same without destroying or marring the previously formed teeth or the face thereof. Stops 53, 53ª are adjusted so that when the tool has been fed forwardly to the required depth the clutch 49 is thrown and the direction of movement of carriage 11 is reversed to move it away from the work. As the carriage approaches its rearward limit of movement the dog 65ª is withdrawn from socket 63 and the work carrying arbor 4 indexed one space.

For a purpose to be described means may also be provided for swinging or oscillating the work holding arbor, during the progress of the cut, around an axis parallel with the arbor and passing through the tooth being cut, although this is not essential and on certain classes of work may be dispensed with. In the machine shown in the drawings the work carrying arbor 4 rotates in a journal box 80 which is slidable in an arc-shaped slot or guideway 81 in the arbor carriage 3 which is provided with brackets 82 to which are pivotally connected arms or levers 83 having intermediate portions 84 embracing arbor 4, and at their outer ends connected to operating links 85, which are reciprocated up and down by oscillating levers 86, each controlled by a cam or eccentric 87 on the transverse shaft 69.

While the machine shown may not be capable of cutting teeth of mathematically correct cross section from end to end, the variation from the correct gear lines, especially on the larger sizes of gears, is so slight as to be negligible, and in fact disappears entirely after a few revolutions of the gears in actual use. On the smaller sizes of gears, however, it is found that the variation is material and becomes greater as the gear decreases in diameter. This is due to the fact that the amount of rise and fall of the cutting portion of the tool, in passing across the face of the gear, is fixed, for a given pair or set of gears. In the case of the smaller gear the distance from the normal position of the tool to the work at the crest of the tooth curve is greater than in the case of a gear of larger diameter. In other words, the angular distance between the crest and end portions of a tooth is greater in case of a small gear than in the case of a large gear. The cutting tool therefore bears a different relation to the teeth of a small gear from what it does to those of a large gear, unless a compensating movement is employed. The nature and amount of variation of the tooth being cut from true tooth lines, of course, depends largely on the relation between the radius of swing of the tool to the radius of the gear being cut, and also the relative positions of the axis of the work arbor and tool spindle. In some cases the tooth being cut may at one point take the form shown by the dotted lines $a$ in Fig. 10, and at other points, or under other circumstances, may take the form shown by dotted lines $b$ in Fig. 11. In either case the proper cutting effect is obtained by swinging the entire gear blank and the work arbor carrying the same around the point $x$ as a center. In the case illustrated in Fig. 10, the gear axis must be elevated to cause the tool to leave an additional small amount of metal at the apex of the tooth, as at $c$, and remove a small additional amount at its root, as at $d$, while in the case of Fig. 11 the gear axis must be dropped to get the reverse effect.

The slot or guideway 81 is formed on the arc of a circle around the point $x$ as a center and the cams or eccentrics 87 are so formed as to swing or oscillate the arbor 4 and the blank around the center $x$ during the progress of the tool across the face of the blank, in accordance with the known variation from the true mathematical cross section which would otherwise occur. It should also be understood that in case the mechanism last described is used, means must also be provided for maintaining coöperating relations between the indexing worm and worm gear. For this reason, the shaft 72 is journaled at its lower end in a bracket 90 which swings around shaft 68 as an axis and carries bevel gears 73. At its upper end said shaft 72 is journaled in a bracket 91 journaled on arbor 4. Worm 74 is splined or otherwise endwise movable on the shaft 72. When the work arbor 4 swings upwardly the shaft 72 swings around shaft 68 as an axis and the worm 74 travels with the worm gear 75 and bracket 91, and slides along its driving shaft 72 as an axis.

What I claim is:

1. The combination of a work holding arbor, a rotatable tool spindle having its axis transverse to the axis of said arbor, a cutter eccentrically mounted on said spindle, means for rotating said spindle to cause the cutter to travel across a cylindrical blank held on said arbor, and means for oscillating said cutter about an axis parallel with the axis of the arbor as the tool travels across the blank.

2. The combination of a work holding arbor, a rotatable tool spindle having its axis transverse to the axis of said arbor, a cutter eccentrically mounted on said spindle, means for rotating said spindle to cause the cutter to travel across a cylindrical blank held on said arbor, and means constructed and arranged to move said cutter toward and from the axis of the arbor while the cutter is moving across the blank, to thereby secure a cut of uniform radial depth from end to end.

3. The combination of a work holding arbor, a rotatable tool spindle having its axis transverse to the axis of said arbor, a cutter eccentrically mounted on said spindle, means for rotating said spindle to cause the cutter to travel across a cylindrical blank held on said arbor, and a cam constructed and arranged to move said cutter toward and from the axis of the arbor as the cutter travels across the blank in accordance with the position of the cutter longitudinally of the blank axis, to thereby secure a cut of uniform depth from end to end.

4. The combination of a work holding arbor, a rotatable tool spindle having its axis transverse to the axis of said arbor, a movable cutter mounted on said spindle at one side of the axis thereof, means for rotating said spindle to cause the cutter to travel across a cylindrical blank held on said arbor, and means constructed and arranged to vary the position of said cutter longitudinally of the spindle in accordance with the curvature of the blank to thereby secure constant depth of cut along the full line of cut across said blank.

5. The combination of a work holding arbor, a rotatable tool spindle having its axis transverse to the axis of said arbor, a cutter eccentrically mounted on said spindle and arranged to move in a plane passing through the axis thereof, means for rotating said spindle to cause the cutter to travel across a cylindrical blank held on said arbor, and means for moving said cutter in said plane toward and from said spindle as the cutter travels across the blank, to thereby secure a cut of uniform depth from end to end.

6. The combination of a work holding arbor, a rotatable tool spindle having its axis transverse to the axis of said arbor, a cutter eccentrically mounted on said spindle and arranged to swing in a plane passing through the axis thereof, means for rotating said spindle to cause the cutter to travel across the blank at each rotation of said spindle, and means for swinging the tool toward and from the blank as it travels thereacross.

7. The combination of a work holding arbor, a rotatable tool spindle having its axis transverse to the axis of said arbor, a cutter eccentrically mounted on said spindle and arranged to swing in a plane passing through the axis thereof, means for rotating said spindle to cause the cutter to travel across the blank at each rotation of said spindle, and a fixed former or guide for swinging said tool on said spindle with reference to the blank as it travels across the same.

8. The combination of a work holding arbor, a rotatable tool spindle having its axis transverse to the axis of said arbor, a tool holder pivoted on said spindle and carrying an eccentrically mounted cutter arranged to traverse the blank at each rotation of said spindle, means for rotating said spindle, a fixed former or guide, and means on said tool holder arranged to contact said former or guide as the tool travels across the blank, and thereby adjust the tool with reference to the blank to secure a cut of uniform depth from end to end.

9. The combination of a work holding arbor, a rotatable tool spindle having its axis transverse to the axis of said arbor, a cutter eccentrically mounted on said spindle, means for rotating said spindle to cause the cutter to travel across a cylindrical blank held on said arbor, said work holding arbor being movable transversely with respect to the axis of said tool spindle, and means for moving said arbor transversely as the cutter travels across the blank.

10. The combination of a work holding arbor, a rotatable tool spindle having its axis transverse to the axis of said arbor, a cutter eccentrically mounted on said spindle, means for rotating said spindle to cause the cutter to travel across a cylindrical blank held on said arbor, and means for swinging said arbor and blank around an axis parallel with said arbor as the tool travels across the blank.

11. The combination of a work holding arbor, a rotatable tool spindle having its axis transverse to the axis of said arbor, a cutter eccentrically mounted on said spindle, means for rotating said spindle to cause the cutter to travel across a cylindrical blank held on said arbor, and a cam operatively connected to said arbor and arranged to swing the blank around an axis passing through the tooth while the tool is crossing the blank.

In testimony whereof, I have hereunto set my hand.

ISAAC E. McCRACKEN.

Witnesses:
WILLIAM B. WHARTON,
WM. P. LARKIN.